United States Patent
Cederberg et al.

[19]

[11] Patent Number: 6,050,377
[45] Date of Patent: Apr. 18, 2000

[54] ROTATIONAL SHIFT CONTROL FOR A VEHICLE TRANSMISSION

[75] Inventors: Russell E. Cederberg, Plainfield, Ill.; Timothy A. Averkamp, Dubuque, Iowa; Ralph D. Price, Fort Wayne, Ind.

[73] Assignee: Case Corporation, Racine, Wis.

[21] Appl. No.: 09/154,407

[22] Filed: Sep. 18, 1998

[51] Int. Cl.[7] .............................. B60K 41/22; G05G 5/08
[52] U.S. Cl. ........................................ 192/3.63; 74/483 R
[58] Field of Search ......................... 74/483 R; 192/3.63

[56] References Cited

U.S. PATENT DOCUMENTS

| | | |
|---|---|---|
| 2,151,376 | 3/1939 | Eastin et al. . |
| 3,011,357 | 12/1961 | Binder . |
| 3,106,996 | 10/1963 | Morris et al. . |
| 3,265,170 | 8/1966 | Olnhausen . |
| 4,146,120 | 3/1979 | Stevens . |
| 4,549,637 | 10/1985 | Huckler et al. . |
| 5,373,924 | 12/1994 | McKee et al. ........................ 192/3.63 |

*Primary Examiner*—Allan D. Herrmann
*Attorney, Agent, or Firm*—Foley & Lardner

[57] ABSTRACT

A rotational shift control for a vehicle transmission includes a control shaft adapted for being operably coupled to the transmission, an interlock member moveable supported adjacent the control shaft and a clutch pedal operably coupled to the interlock member. The control shaft includes a non-cylindrical outer circumferential surface and is rotatable about an axis between a neutral position and a geared position. The interlock member is moveable in a direction along the axis and includes a locking surface opposite the non-cylindrical outer circumferential surface. The interlock member moves between a first engaged position in which the locking surface engages the control shaft to prevent rotation of the shaft and a second disengaged position in which the locking surface disengages the control shaft to enable rotation of the shaft between the neutral position and the geared position. The interlock member is preferably configured to be moved into the engaged position only when the control shaft is in the neutral position. Depressment of the clutch pedal moves the interlock member from the first engaged position to the second disengaged position.

20 Claims, 5 Drawing Sheets

ROTATIONAL SHIFT CONTROL FOR A VEHICLE TRANSMISSION

FIELD OF THE INVENTION

The present invention relates to a shift control for a vehicle transmission. In particular, the present invention relates to the rotational shift control for shifting between a neutral position and a geared position in a vehicle transmission.

BACKGROUND OF THE INVENTION

Rotational shift controls are utilized in vehicles such as automobiles, tractors, construction equipment and the like to shift the transmission of the vehicles to and from a neutral position and various gears. Rotational shift controls are typically either electrical or mechanical. Electrical shift controls utilize electronic controls in which a lever coupled to a magnetic switch sends an electronic impulse to a set solenoids in the transmission to select the gear. Despite being very compact, such electronic shift controls are expensive. As a result, several cost competitive or cost efficient vehicles still utilize mechanical shift controls.

Mechanical shift controls typically include an elongate, rigid control shaft which is coupled to the vehicle transmission via an arm and an interconnected linkage. The control shaft itself is coupled to a lever. Rotation of the lever rotates the control shaft which rotates the arm to cause linear translation of the linkage which moves the transmission between neutral and geared positions. To prevent inadvertent shifting of the transmission between neutral and the geared positions caused by inadvertent rotation of the control shaft, prior mechanical shift controls have included interlocking mechanisms having a locking pin oriented perpendicular to the axis of the control shaft and moveable into an aligned detent in the control shaft such that the pin prevents rotation of the control shaft. Actuation of the locking pin is effected by depressment of a clutch pedal which is operably connected to the locking pin by cable. Because actuation of the locking pin between an engaged position and a disengaged position occurs along a direction perpendicular to the axis of rotation of the control shaft, the mechanism for actuating the pin requires a large amount of valuable space. In some cost competitive or cost efficient vehicles, the clutch pedal and the control shaft are positioned so close to one another that the required space is simply not available.

To reduce the amount of space required by the interlocking mechanism, some mechanical shift controls utilize an interlocking mechanism having a plate radially extending from the control shaft and a locking pin which is actuated in a direction parallel to the axis of the control shaft. In such interlocking mechanisms, the pin projects into or across slots or apertures which are angularly aligned with each of the geared positions as well as the neutral position. To shift between different geared positions or to shift between one of the geared positions and a neutral position, the clutch pedal is depressed which moves the locking pin out of engagement with the slot or aperture to enable the control shaft and its attached plate to be rotated to another position. Release of the clutch pedal causes the pin to once again project into or across the adjacent slot or opening to lock the rotational control shaft in place. Despite occupying less space than the interlocking mechanism which utilize a perpendicular locking pin, these parallel interlocking mechanisms still occupy a relatively large amount of valuable space about the control shaft. Moreover, such parallel pin interlocking mechanisms require that the clutch pedal be depressed for shifting the transmission from a geared position to neutral. Consequently, despite this advancement in the art, there is still a continuing need for a mechanism for a mechanical rotational shift control having an interlocking mechanism which is reliable, compact and provides for easy shifting into the neutral position.

SUMMARY OF THE INVENTION

A rotational shift control for a vehicle transmission includes a control shaft adapted for being operably coupled to the transmission, an interlock member moveable supported adjacent the control shaft and a clutch pedal operably coupled to the interlock member. The control shaft includes a non-cylindrical outer circumferential surface and is rotatable about an axis between a neutral position and a geared position. The interlock member is moveable in a direction along the axis and includes a locking surface opposite the non-cylindrical outer circumferential surface. The interlock member moves between a first engaged position in which the locking surface engages the control shaft to prevent rotation of the shaft and a second disengaged position in which the locking surface disengages the control shaft to enable rotation of the shaft between the neutral position and the geared position. Depressment of the clutch pedal moves the interlock member from the first engaged position to the second disengaged position.

The present invention is also directed to a rotational shift control for a vehicle transmission which includes a control shaft adapted for being operably coupled to the transmission and an interlock member movably supported adjacent the control shaft. The control shaft is rotatable about an axis between a neutral position and a geared position. The interlock member is moveable in a direction along the axis from an engaged position in which the member prevents rotation of the control shaft to a disengaged position in which the member allows rotation of the control shaft. The interlock member is configured to be moved into the engaged position only when the control shaft is in the neutral position. As a result, the interlock member does not prevent rotation of the control shaft from the geared position to the neutral position.

The present invention is also directed to a rotational shift control for a vehicle transmission which includes a control shaft adapted for being operably coupled to the transmission, a moveable locking surface adjacent the control shaft and a clutch pedal operably coupled to the moveable locking surface. The control shaft is rotatable about an axis between a neutral position and a geared position and includes a non-cylindrical outer circumferential surface. The moveable locking surface is affixed against rotation about the axis and is moveable from the engaged position in which the locking surfaces abuts the non-cylindrical outer circumferential surface of the control shaft to prevent rotation of the control shaft out of the neutral position to a disengaged position in which the locking surface is sufficiently spaced from the non-cylindrical outer circumferential surface of the control shaft to allow the control shaft to rotate out of the neutral position to the geared position. Depressment of the clutch pedal moves the locking surface from the engaged position to the disengaged position.

DETAILED DESCRIPTION OF THE PREFERRED EMBODIMENT

Figure 1:
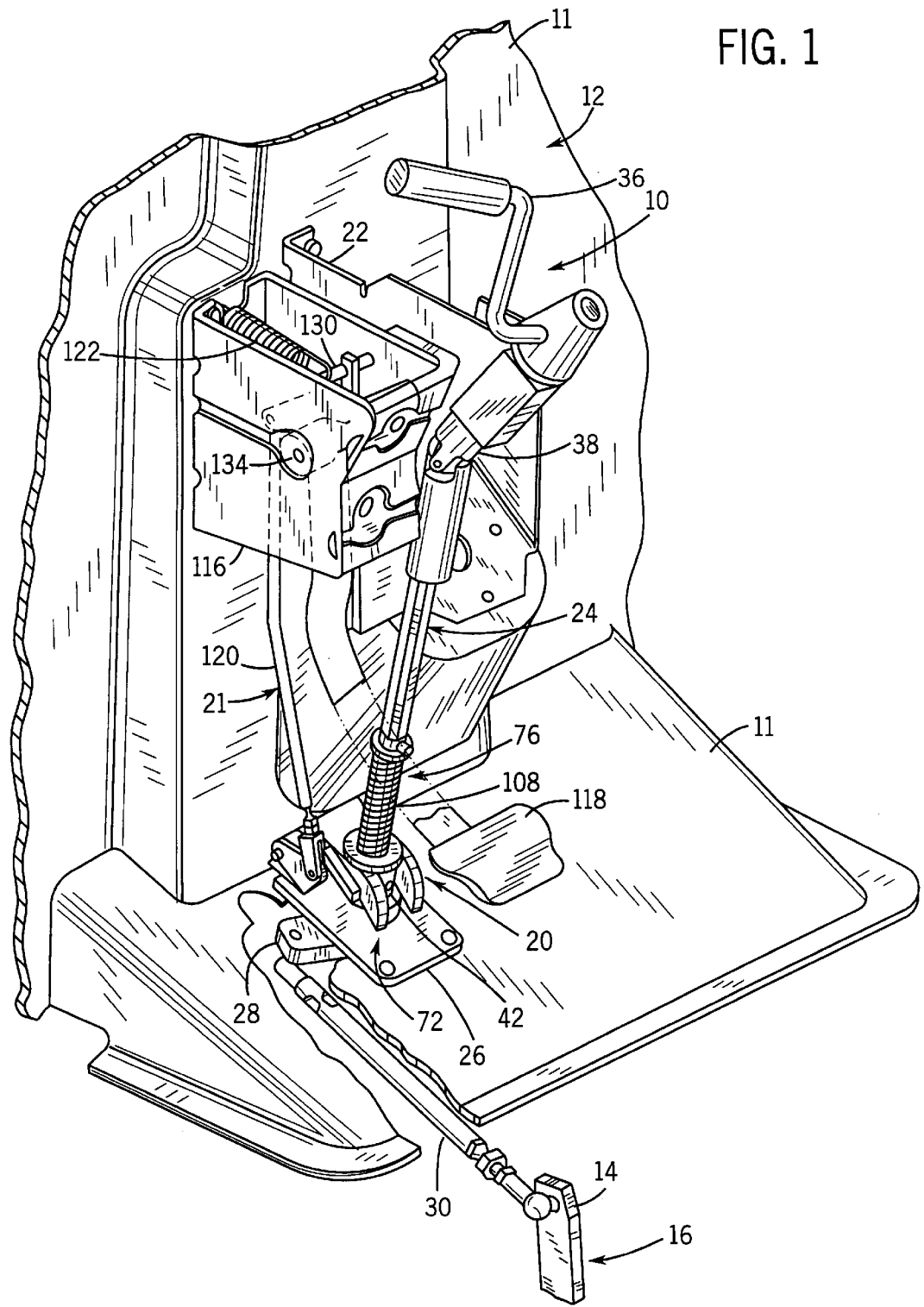
FIG. 1 is a fragmentary perspective view of a vehicle operator station including a mechanical rotational shift control with an interlocking mechanism of the present invention operatively coupled to a vehicle transmission.
Figure 2:
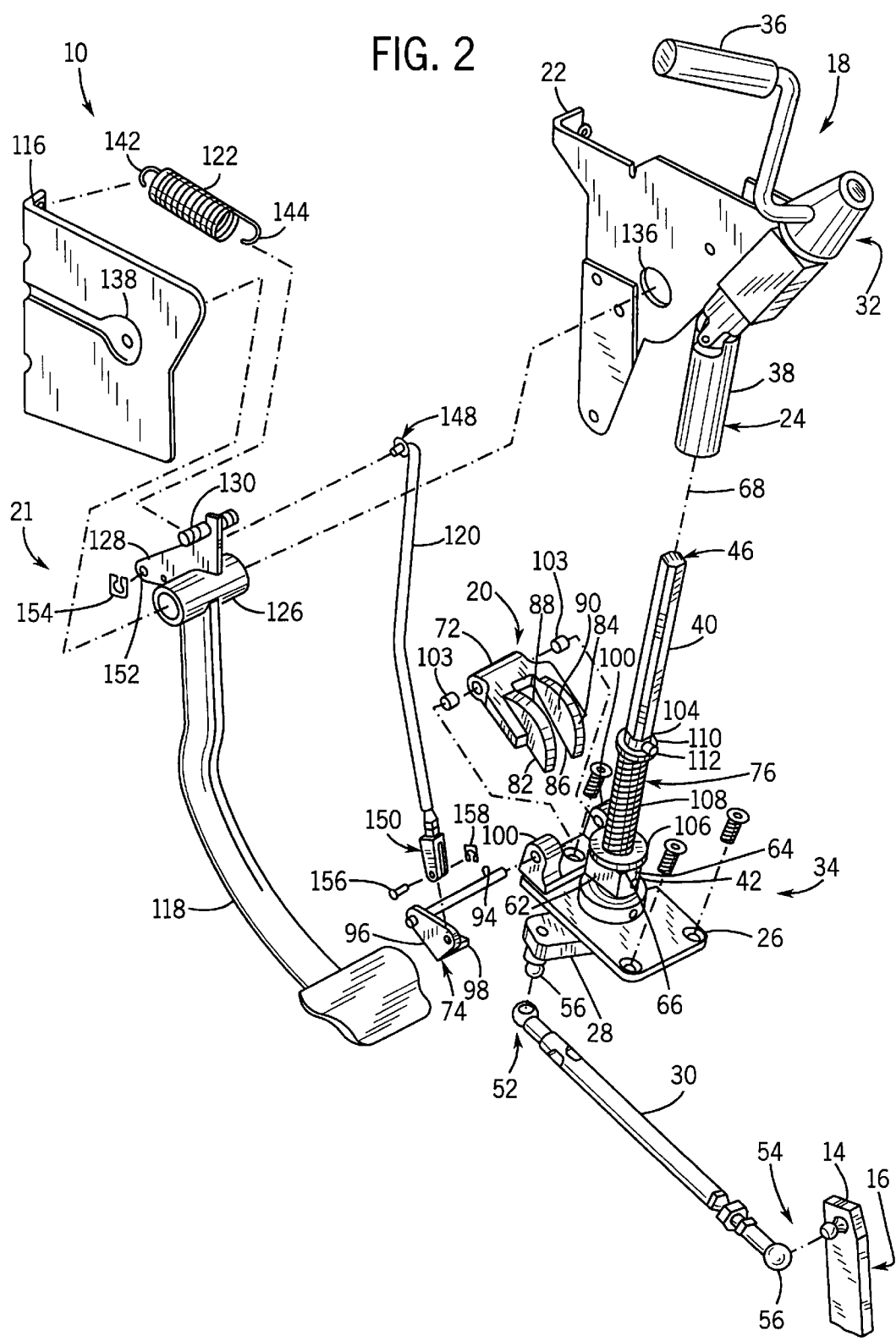
FIG. 2 is an exploded perspective view of the rotational shift control of FIG. 1 adjacent the vehicle transmission.

FIG. 1 is a fragmentary perspective view of a mechanical, rotational shift control 10 assembled as part console 11 of a vehicle operator station 12 and operably connected to gear shift linkage 14 of a conventional vehicle transmission 16. FIG. 2 is an exploded perspective view illustrating rotational shift control 10 separated from operator station 12 and linkage 14 of transmission 16. As shown by FIGS. 1 and 2, rotational shift control 10 generally includes shifting mechanism 18, interlocking mechanism 20 and clutch pedal control 21. Shifting mechanism 18 is directly coupled to linkage 14 of transmission 16. Upon being rotated, shifting mechanism 18 moves linkage 14 to shift transmission 16 between a forward gear, a reverse gear and a neutral position. Shifting mechanism 18 generally includes bracket 22, control shaft 24, bracket 26, arm 28 and rod assembly 30. Bracket 22 is fixedly mounted to console 11 of operator station 12 (shown in FIG. 1) and rotatably supports control shaft 24. As will be appreciated, bracket 22 may have any of a variety of shapes, sizes and configurations depending upon console 11 and control shaft 24.

Control shaft 24 is rotatably supported by bracket 22 at an upper end 32 and is rotatably supported by bracket 26 at a lower end 34. Control shaft 24 generally includes lever 36, joint 38, rod 40 and collar 42. Lever 36 extends at the upper end 32 of control shaft 24 and is coupled to joint 38 which is coupled to rod 40. Lever 36 enables manual rotation of control shaft 24 by the operator to rotate arm 28 and thereby cause translation of linkage 14 via rod assembly 30 to shift between the forward, reverse and neutral positions.

Joint 38 is connected between lever 36 and rod 40. Joint 38 provides a pivotal connection between lever 36 and rod 40 such that lever 36 is tilted towards the operator for easier manipulation. Rod 40 comprises an elongate member and has an upper end 46 non-rotatably coupled to joint 38 and a lower end 48 (shown in FIG. 3) non-rotatably coupled to arm 28. As a result, rotation of lever 36 correspondingly rotates joint 38 and rod 40 to rotate arm 28.

Collar 42 is non-rotatably coupled to rod 40 adjacent bracket 26 and provides control shaft 24 with a non-cylindrical outer circumferential surface. Collar 42 cooperates with interlocking mechanism 20 to selectively prevent rotation of control shaft 24 out of a neutral position. Although collar 42 is illustrated as comprising a separate component pinned to shaft 40, collar 42 may alternatively be non-rotatably coupled to rod 40 by various other fasteners or adhesives. Furthermore, collar 42 may alternatively be integrally formed as a single, unitary body with rod 40. In the exemplary embodiment, collar 42 is generally an elongate, rectangular member providing two parallel flats 62, 64. Collar 42 also provides a shoulder 66 extending in a plane oblique and preferably perpendicular to axis 68 about which control shaft 24 rotates. As will be appreciated, collar 42 may have various other sizes and configurations depending upon the mating components of interlocking mechanism 20.

Arm 28 eccentrically extends from rod 40 below bracket 26 and is rotatably coupled to rod assembly 30. Rod assembly 30 is rotatably coupled to arm 28 at a first end 52 and is rotatably coupled to linkage 14 of transmission 16 at a second end 54. In the exemplary embodiment, rod assembly 30 is rotatably coupled to arm 28 and linkage 14 by ball and socket joints 56. As will be appreciated, rod assembly 30 may be rotatably coupled to arm 28 and linkage 14 by various other well-known arrangements. Rotation of arm 28 by control shaft 24 linearly translates rod assembly 30 so as to correspondingly move linkage 14 to shift transmission 16 between the forward, reverse and neutral positions.

Interlocking mechanism 20 mounts to console 11 and cooperates with collar 42 of control shaft 24 to selectively prevent rotation of control shaft 24. In the exemplary embodiment, interlocking mechanism 20 cooperates with collar 42 to prevent interadvertent movement of control shaft 24 out of the neutral position. At the same time, interlocking mechanism 20 enables control shaft 24 to be rotated from a geared position into the neutral position without release of the interlocking mechanism. Interlocking mechanism 20 is directly coupled to and actuated by clutch pedal control 21. Interlocking mechanism 20 generally includes interlock member 72, actuator 74 and bias mechanism 76. Interlock member 72 is movably supported adjacent to collar 42 of control shaft 24 and moves in a direction parallel to and along axis 68 between a first engaged position in which interlock member 72 engages collar 42 of control shaft 24 to prevent rotation of shaft 24 and a second disengaged position in which interlock member 72 disengages collar 42 of control shaft 24 to enable rotation of control shaft 24 between the neutral position and the forward or reverse geared positions. Interlock member 72 is fixed against rotation about axis 68 and engages the non-cylindrical outer circumferential surface of collar 42. In the exemplary embodiment, interlock member 72 comprises a pawl having a pair of opposing legs 82, 84 which are spaced from one another by an intervening slot 86 and which are pivotally coupled to brackets 26 for movement between the engaged and disengaged positions. Slot 86 is sized and configured to receive collar 42 when flats 62, 64 are positioned so as to at least partially face legs 82 and 84, respectively. In the engaged position, legs 82 and 84 of interlock member 72 entrap flats 62, 64 of collar 42 to prevent rotation of control shaft 24. Legs 82 and 84 provide opposing inside flats 88 and 90, respectively, which preferably abut flats 62, 64 of collar 42.

Interlock member 72 moves and preferably pivots between the engaged and disengaged positions. Interlock member 72 is pivoted between the engaged and disengaged positions by actuator 74. Actuator 74 generally includes pivot pin 94, extension 96 and lifting tab 98. Pivot pin 94 extends through trunnion supports 100 extending from bracket 26 and further extends through bushings 103 coupled to interlock member 72 to pivotally support interlock member 72 about the axis of pivot pin 94. Extension 96 extends from the axis of pivot pin 94 and is coupled to clutch pedal control 21. Extension 96 supports lifting tab 98. Lifting tab 98 projects from extension 96 at a location spaced from pivot pin 94 so as to engage interlock member 72 at a location spaced from the axis of pin 94 about which interlock member 72 pivots. Rotation of actuator 74 about the axis of pivot pin 94 causes lifting tab 98 to lift and pivot interlock member 72 from the engaged position to the disengaged position.

Bias mechanism 76 resiliently biases interlock member 72 towards the engaged position in which slot 86 receives collar 42. Bias mechanism 76 generally includes upper stop 104, lower engagement plate 106 and spring 108. Upper stop 104 provides a surface for axially retaining spring 108. In the exemplary embodiment, upper stop 104 comprises a washer 110 axially retained by a pin 112. As will be appreciated, upper stop 140 may comprise various other structures for axially retaining spring 108. For example, upper stop 104 may simply comprise a shoulder integrally formed as part of rod 40 in abutment with spring 108.

Lower engagement plate 106 encircles rod 140 and is configured for slidable movement along axis 68 of rod 40. Engagement plate 40 cooperates with upper stop 104 to capture spring 108 therebetween. Engagement plate abuts interlock member 72.

Spring 108 encircles axis 68 of rod 40 and resiliently biases engagement plate 106 towards collar 42. Spring 108 urges engagement plate 106 against interlock member 72 so as to bias interlock member 72 downward towards collar 42 and towards the engaged position. Although less desirable, interlocking mechanism may omit bias mechanism 76 by simply relying upon gravity to urge interlock member 72 towards the engaged position. Due to this configuration, interlock member 72 is continually urged towards the engaged position by gravity even when bias mechanism 76 fails. Consequently, interlocking mechanism 20 more reliably secures control shaft 24 in the neutral position.

Clutch pedal control 21 is coupled to actuator 74 and moves actuator 74 so as to correspondingly actuate interlock member 72 from the engaged position to the disengaged position. Clutch pedal control 21 generally includes bracket 116, clutch pedal 118, linkage 120 and clutch pedal return spring 122. Bracket 116 mounts to console 11 opposite bracket 22. Bracket 116 is configured so as to cooperate with bracket 22 to pivotally support clutch pedal 118 therebetween. As will be appreciated, the size and configuration of bracket 116 may be varied depending upon the exact configuration of clutch pedal 118 and console 11.

Clutch pedal 118 is an elongate pedal having a bushing portion 126, an extension portion 128 and a spring retaining pin 130. Bushing portion 126 is a generally elongate tubular member fixedly coupled to clutch pedal 118 and sized to receive axle pin 134 (shown in FIG. 3). Axle pin 134 extends through bushing portion 126 and through a pair of aligned apertures 136 and 138 within brackets 22 and 116, respectively, to pivotally support clutch pedal 118. Extension 128 extends away from the axis of pivot shaft 134 and is configured for being rotatably coupled to linkage 120. As a result, pivotal movement of clutch pedal 118 about the axis of axle pin 134 rotates extension 128 to lift linkage 120. Spring retaining pin 130 projects from extension 128 on an opposite side of the axis of axle pin 134. Pin 130 is configured for being coupled to spring 122.

Spring 122 comprises a conventionally known coil spring having a first end 142 fastened to bracket 116 and a second opposite end 144 fastened to pin 130. Spring 122 resiliently biases clutch pedal 118 for rotation about the axis of axle pin 134 such that extension 128 remains in a lowered position and such that clutch pedal 118 remains in an elevated position.

Linkage 120 comprises an elongate, rigid rod having a first end 148 rotatably connected to extension 128 and a second end 150 pivotally connected to extension 96 of actuator 74 at a location spaced from the axis of pivot pin 94. In the exemplary embodiment, end 148 projects through aperture 152 and is held in place by clip 154. End 150 is pivotally connected to actuator 74 by pin 156 which extends through the forked configuration of end 50 and through extension 96 of actuator 74. Pin 156 is retained on end 150 by clip 158. As will be appreciated, ends 148, 150 may be pivotally connected to clutch pedal control 118 and actuator 74 by various other well-known fastening arrangements.

As a result, depressment of clutch pedal 118 pivots clutch pedal 118 about the axis of axle pin 134 to extend spring 122 and to rotate extension 128 about the axis of axle pin 134. Rotation of extension 128 lifts linkage 120 which correspondingly lifts and pivots actuator 74 about the axis of axle pin 94. The pivoting of actuator 74 about axle pin 94 lifts lifting tab 98 which is in engagement with interlock member 72. As a result, lifting tab 98 pivots interlock member 72 about the axis of axle pin 94 from the engaged position to the disengaged position above and out of engagement with collar 42 of control shaft 24.

Figure 3:
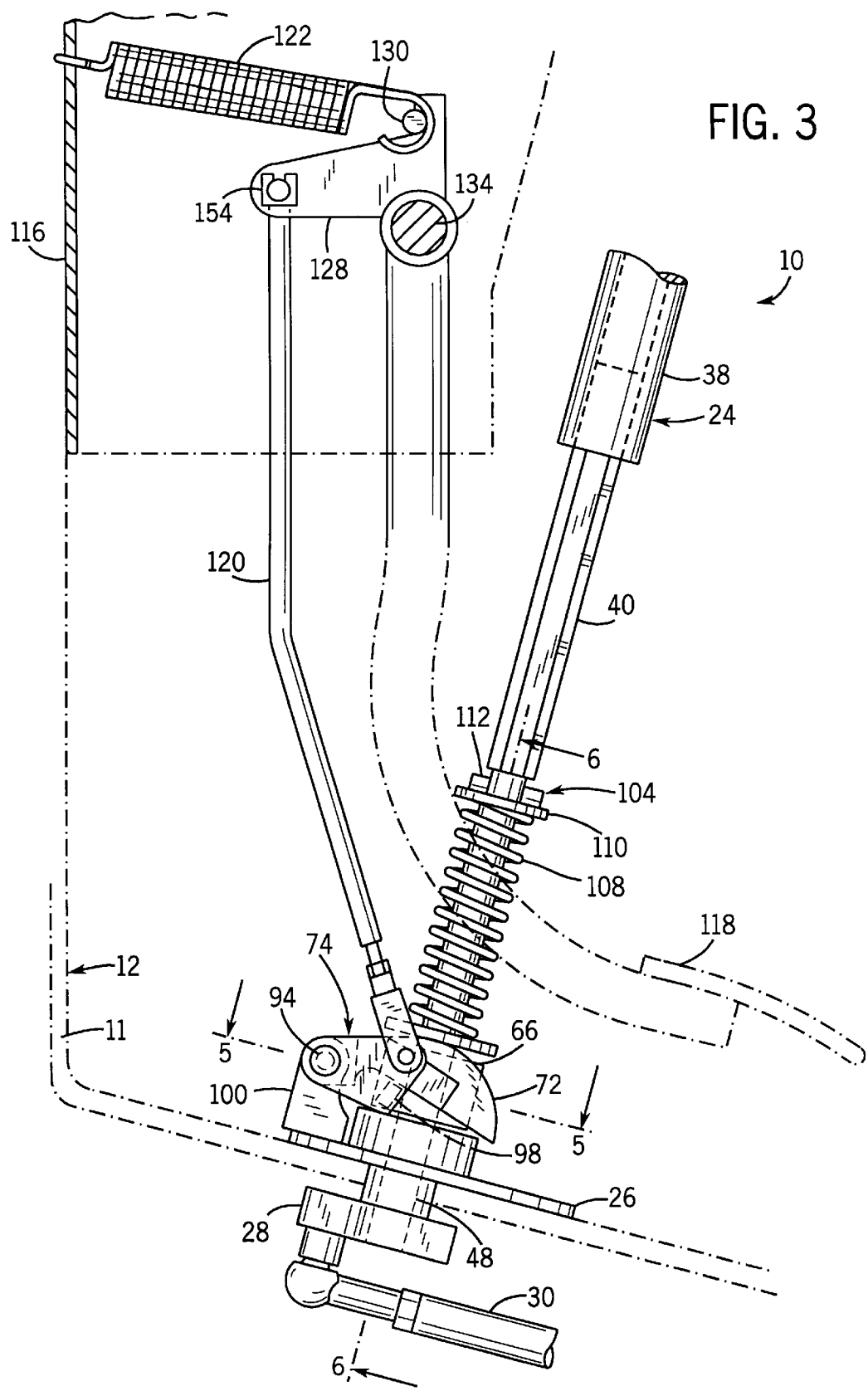
FIG. 3 is a side elevational view of the rotational shift control of FIG. 1 with the interlocking mechanism in an engaged position.
Figure 4:
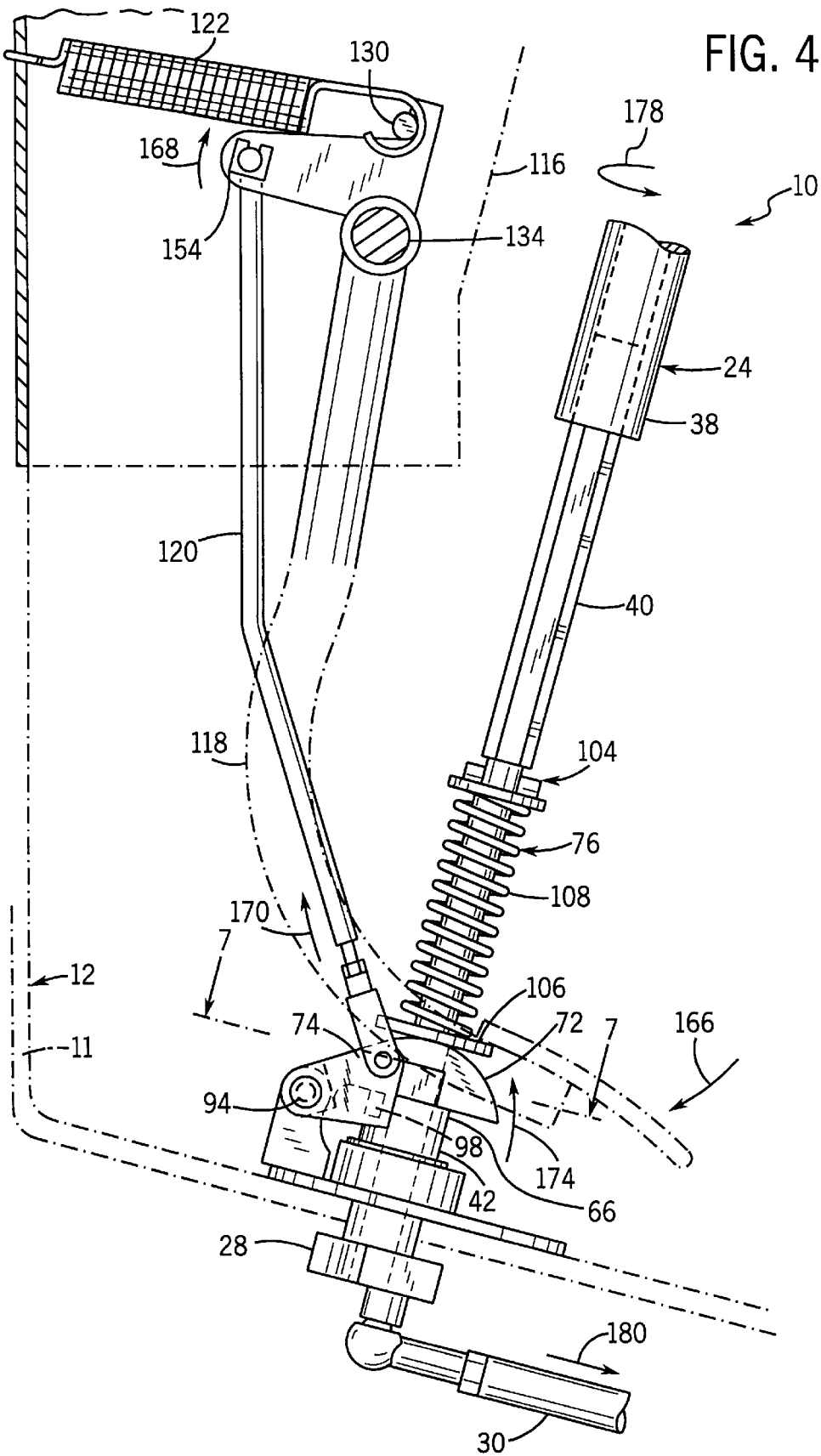
FIG. 4 is a side elevational view of the rotational shift control of FIG. 3 with the interlocking mechanism in a disengaged position.
Figure 5:
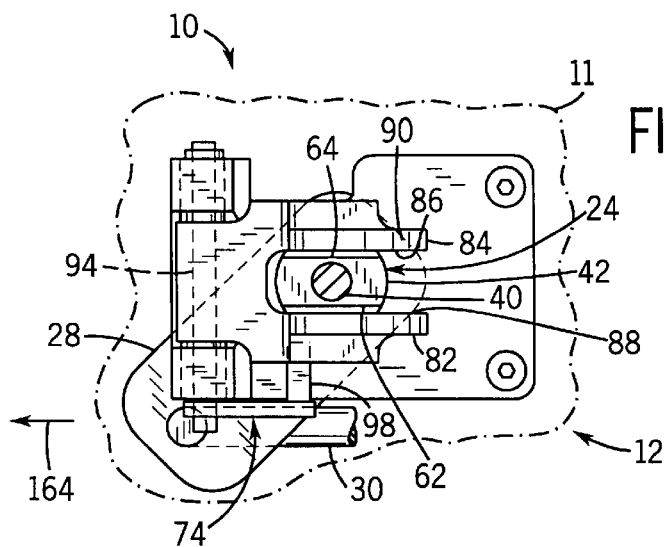
FIG. 5 is a sectional view of the rotational shift control of FIG. 3 taken along lines 5—5.
Figure 6:
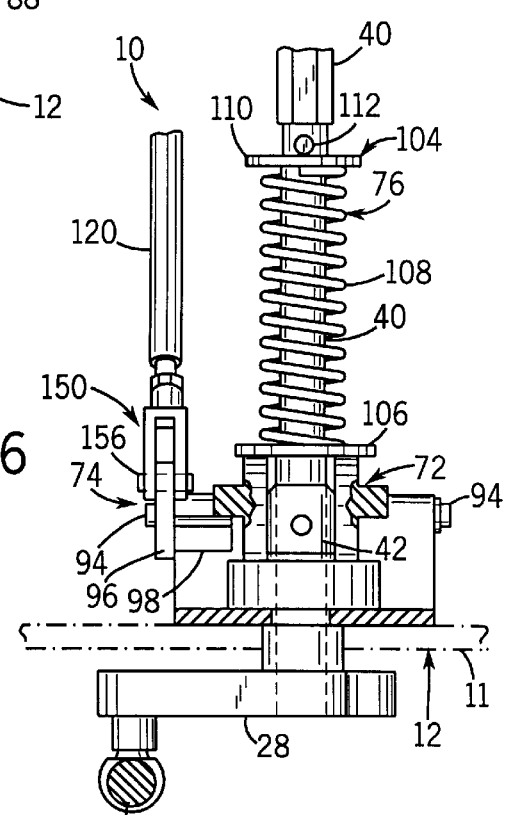
FIG. 6 is a sectional view of the rotational shift control of FIG. 3 taken along lines 6—6.

FIGS. 3–7 illustrate the operation of rotational shift control 10 in greater detail. FIGS. 3, 5 and 6 illustrate control shaft 24 rotated into a neutral position with interlock member 72 actuated into the engaged position so as to prevent inadvertent rotation of control shaft 24 out of the neutral position. As best shown by FIG. 5, in the neutral position, control shaft 24 is rotated such that arm 28 extends from control shaft 24 approximately 45 degrees such that linkage 30 is moved in the direction indicated by arrow 164. In this neutral position, flats 62, 64 of collar 42 extend substantially parallel with inside flats 88, 90 of legs 82, 84 such that collar 42 is aligned within slot 86 of interlock member 72. As a result, interlock member 72 pivots, under the force of gravity, about the axis of pivot pin 94 so as to receive collar 42 and entrap collar 42 between legs 82 and 84. As best shown by FIG. 6, to ensure that interlock member 72 pivots and receives collar 42 when control shaft 24 is in the neutral position, spring 108 forces plate 106 against upper surfaces of legs 82, 84 so as to force interlock member 72 to pivot and receive collar 42.

Figure 7:
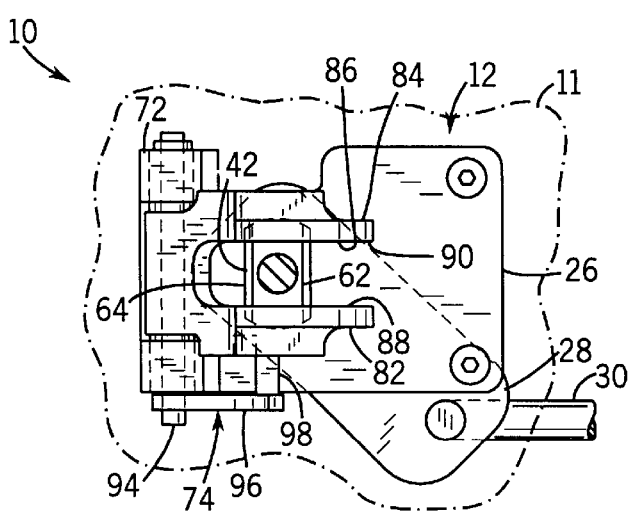
FIG. 7 is a sectional view of the rotational shift control of FIG. 4 taken along lines 7—7.

FIGS. 4 and 7 illustrate depressment of clutch pedal 118 to actuate actuator 74 so as to lift or pivot interlock member 72 to the disengaged position and to enable rotation of control shaft 24 to a geared position. As shown by FIG. 4, depressment of clutch pedal 118 in the direction indicated by arrow 164 pivots clutch pedal 118 about the axis of axle pin 134 in a clockwise direction against the bias of spring 122. The rotation of extension 128 of clutch pedal 118 in the direction indicated by arrow 168 lifts linkage 120 in the direction indicated by arrow 170. As a result, linkage 120 pivots actuator 74 and its lifting tab 98 about the axis of pivot pin 94 to bring lifting tab 98 into engagement with interlock member 72. Lifting tab 98 engages interlock member 72 to also pivot interlock member 72 about the axis of pivot pin 94 in the direction indicated by arrow 174. The lifting force applied to interlock member 72 must be greater than the downward bias force provided by spring 108 of bias mechanism 76 to lift interlock member 72 above collar 42. Once interlock member 72 is pivoted such that legs 82 and 84 extend completely above shoulder 66 of collar 42, into the disengaged position, control shaft 24 may be rotated by manipulation of lever 36 (shown in FIG. 2) in the direction indicated by arrow 178. Rotation of control shaft 24 in the direction indicated by arrow 178 correspondingly rotates arm 28 to linearly translate rod assembly 30 in the direction indicated by arrow 180. Movement of rod assembly 30 in the direction indicated by arrow 180 actuates linkage 14 (shown in FIG. 2) to shift the transmission 16 into gear.

As best shown by FIG. 7, rotation of control shaft 24 to a geared position correspondingly rotates collar 42 below interlock member 72 such that collar 42 is out of alignment with slot 86 of interlock member 72. Consequently, legs 82 and 84 rest upon shoulder 66 while control shaft 24 is in a geared position. Because lifting tab 98 is not positively fixed to interlock member 72, spring 122 (shown in FIG. 3) returns linkage 120 and clutch pedal 118 to their initial positions. To shift transmission 16 out of gear into neutral, the operator needs merely to shift lever 36 so as to rotate control shaft 24. As control shaft 24 approaches the neutral position, flats 62 and 64 align within slot 86 of interlock member 72 and spring 108 forces interlock member 72 down over collar 42 once again locking control shaft 24 in the neutral position. Consequently, control shaft 24 may be shifted or rotated from a geared position into the neutral position without requiring depression of clutch pedal 118. However, shift control 10 prevents shifting or rotation of control shaft 24 from the neutral position into gear without interlock member 72 being actuated to the disengaged position by depression of clutch pedal 118.

Overall, rotational shift control 10 provides a reliable and compact mechanical shift control which provides easy shifting from a geared position to the neutral position and which reliably maintains the transmission in the neutral position. Because interlocking mechanism 20 utilizes a control shaft having a non-cylindrical outer circumferential surface in conjunction with an opposing locking surface opposite the non-cylindrical outer circumferential surface of the control shaft, interlocking mechanism 20 does not require radially extending plates or perpendicularly extending pins which occupy valuable space about the control shaft. Because interlocking mechanism 20 utilizes an interlock member that engages opposite sides of the non-cylindrical outer circumferential surface of the control shaft, interlocking mechanism 20 reliably prevents inadvertent rotation of control shaft 24 and inadvertent shifting of transmission 16 into the geared position without requiring excessive space. Because interlocking mechanism 20 includes a bias mechanism 76 which extends about control shaft 24, interlocking mechanism 20 occupies even less space. Moreover, even in the event of failure of bias mechanism 76, interlock member 72 automatically engages control shaft 24 under the influence of gravity when control shaft 24 is positioned in neutral. In addition, because interlock member 72 is configured to be moved into the engaged position only when the control shaft is in the neutral position, interlock member 72 does not inhibit rotation of control shaft 24 from the geared position to the neutral position. Consequently, clutch pedal 118 does not need to be depressed for shifting from a geared position to the neutral position.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A rotational shift control for a vehicle transmission, the shift control comprising:

a control shaft adapted for being coupled to the transmission, wherein the control shaft includes a non-cylindrical outer circumferential surface and wherein the control shaft is rotatable about an axis between a neutral position and a geared position;

an interlock member having a locking surface opposite the non-cylindrical outer circumferential surface of the control shaft movably supported adjacent the control shaft, wherein the interlock member moves at least partially parallel to the axis between a first engaged position in which the locking surface engages the non-cylindrical outer circumferential surface of the control shaft to prevent rotation of the shaft and a second disengaged position in which the interlock member disengages the non-cylindrical outer circumferential surface of the control shaft to enable rotation of the control shaft between the neutral position and the geared position; and a clutch pedal operatively coupled to the interlock member, wherein depression of the clutch pedal moves the interlock member from the first engaged position to the second disengaged position.

2. The shift control of claim 1, wherein the interlock member is pivotally supported adjacent the control shaft so as to pivot between the first engaged position and the second disengaged position.

3. The shift control of claim 2, wherein the interlock member pivots within a plane including the axis of the control shaft.

4. The shift control of claim 1, including means for biasing the interlock member towards the first engaged position.

5. The shift control of claim 4, wherein the means exerts a bias force in a direction parallel to the axis of the control shaft.

6. The shift control of claim 5, wherein the means comprises a helical spring extending adjacent the control shaft.

7. The shift control of claim 1, including a helical spring about the shaft and in engagement with the interlock member to bias the interlock member towards the first engaged position.

8. The shift control of claim 1, wherein the clutch pedal includes a lifting member releasibly engaging the interlock member.

9. The shift control of claim 1, wherein the interlock member engages the control shaft in the engaged position when the control shaft is in the neutral position with the clutch elevated.

10. The shift control of claim 1, wherein the interlock member engages opposite sides of the non-cylindrical outer circumferential surface.

11. The shift control of claim 10, wherein the control shaft includes a pair of outer parallel flat surfaces which are engaged by the interlock member.

12. The shift control of claim 11, wherein the interlock member comprises a cam having inner parallel flat surfaces engaging the outer parallel flat surfaces of the control shaft.

13. The shift control of claim 1, including a shoulder supporting the interlock member in the disengaged position when the shaft is rotated out of the neutral position.

14. A rotational shift control for a vehicle transmission, the shift control comprising:

a control shaft adapted for being operably coupled to the transmission, wherein the control shaft is rotatable about an axis between a neutral position and a geared position;

an interlock member movably supported adjacent the control shaft, the interlock member being moveable in a direction along the axis, from an engaged position in which the member prevents rotation of the control shaft to a disengaged position in which the member allows rotation of the control shaft out of the neutral position to the geared position, wherein the interlock member is configured to be moved into the engaged position only when the control shaft is in the neutral position, whereby the interlock member does not prevent rotation of the control shaft from the geared position to the neutral position.

15. The shift control of claim 14 including:

a bias mechanism resiliently biasing the interlock member towards the engaged position; and a clutch pedal operably coupled to the interlock member, wherein depressment of the clutch pedal moves the interlocking member against the bias mechanism from the engaged position to the disengaged position.

16. The shift control of claim 15 wherein the bias mechanism comprises a helical spring extending along the control shaft and is in forceful engagement with the interlock member.

17. The shift control of claim 16, wherein the helical spring extends about the control shaft.

18. The shift control of claim 15, wherein the interlock member is pivotally supported adjacent the control shaft for movement between the engaged position and the disengaged position and wherein depressment of the clutch pedal pivots the interlock member against the bias mechanism from the engaged position to the disengaged position.

19. A rotational shift control for a vehicle transmission, the shift control comprising:

a control shaft adapted for being operably coupled to the transmission, wherein the control shaft is rotatable about an axis between a neutral position and a geared position and wherein the control shaft includes a first non-cylindrical outer circumferential surface;

a moveable locking surface supported adjacent to the control shaft and affixed against rotation along the axis, wherein the moveable locking surface moves in a direction at least partially along the axis from an engaged position in which the locking surface abuts the first non-cylindrical outer circumferential surface of the control shaft to a disengaged position in which the locking surface is sufficiently spaced from the first non-cylindrical outer circumferential surface of the control shaft to allow the control shaft to rotate about the axis between the neutral position and the geared position; and a clutch pedal extending adjacent the control shaft and operably coupled to the locking surface, wherein depressment of the clutch pedal moves the locking surface from the engaged position to the disengaged position.

20. The shift control of claim 19, including a rigid rod interconnecting the clutch pedal and the locking surface.

* * * * *